(12) United States Patent
Eggermont et al.

(10) Patent No.: US 10,756,616 B2
(45) Date of Patent: Aug. 25, 2020

(54) METHODS AND SYSTEMS OF A RECTIFIER CIRCUIT

(71) Applicant: SEMICONDUCTOR COMPONENTS INDUSTRIES, LLC, Phoenix, AZ (US)

(72) Inventors: Jean-Paul Eggermont, Pellaines (BE); Johan Camiel Julia Janssens, Asse (BE)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 0 days.

(21) Appl. No.: 16/015,464

(22) Filed: Jun. 22, 2018

(65) Prior Publication Data
US 2019/0393768 A1    Dec. 26, 2019

(51) Int. Cl.
*H02M 1/08* (2006.01)
*H02M 1/00* (2006.01)
*H02M 7/217* (2006.01)

(52) U.S. Cl.
CPC ............. *H02M 1/08* (2013.01); *H02M 7/217* (2013.01); *H02M 2001/0048* (2013.01)

(58) Field of Classification Search
CPC ........ H02M 1/08; H02M 1/32; H02M 1/4208; H02M 3/157; H02M 3/1584; H02M 7/06; H02M 7/068; H02M 7/10; H02M 7/219; H02M 7/217; H02M 2001/0048
See application file for complete search history.

(56) References Cited

U.S. PATENT DOCUMENTS

| | | | |
|---|---|---|---|
| 5,568,373 A * | 10/1996 | Small | H02M 1/32 363/132 |
| 7,265,525 B2 | 9/2007 | Xu et al. | |
| 2006/0043499 A1* | 3/2006 | De Cremoux | H03K 17/063 257/401 |
| 2011/0199799 A1 | 8/2011 | Hui et al. | |

(Continued)

OTHER PUBLICATIONS

Janssens, Johan, et al.; "A fully-floating starter-alternator driver in a dynamically-biased I2T100 substrate;" Vilvorde Design Center, Mixed Signal Products Division, AMI Semiconductor, Inc.; 2008; 4 pages.

(Continued)

*Primary Examiner* — Adolf D Berhane
*Assistant Examiner* — Kevin H Sprenger
(74) *Attorney, Agent, or Firm* — Dickinson Wright PLLC; Mark E. Scott

(57) ABSTRACT

Rectifier circuit. At least some of the example embodiments are circuits including: an anode terminal; a cathode terminal; a field effect transistor (FET) defining a drain, source, and gate, the source coupled to the anode terminal, and the drain coupled to the cathode terminal; a diode having anode and cathode, the anode coupled to the cathode terminal; a bootstrap capacitor coupled between the cathode of the diode and the anode terminal; a FET controller coupled to the gate of the FET and a node between the diode and bootstrap capacitor; the FET controller configured to make the FET conductive as the circuit becomes forward biased, and the FET controller configured to make the FET nonconductive during periods of time when the circuit is reverse biased.

21 Claims, 4 Drawing Sheets

(56) References Cited

U.S. PATENT DOCUMENTS

| | | | | |
|---|---|---|---|---|
| 2012/0146533 A1* | 6/2012 | Park | ............... | H05B 33/0815 |
| | | | | 315/224 |
| 2013/0127371 A1* | 5/2013 | Sarig | ............... | H02M 1/08 |
| | | | | 315/307 |
| 2013/0151919 A1* | 6/2013 | Huynh | ............... | G06F 1/26 |
| | | | | 714/746 |
| 2014/0085952 A1* | 3/2014 | Ptacek | ............... | H02M 1/08 |
| | | | | 363/127 |
| 2014/0361696 A1* | 12/2014 | Siessegger | ............... | H05B 33/0803 |
| | | | | 315/186 |
| 2015/0015160 A1* | 1/2015 | Angelin | ............... | H05B 33/0815 |
| | | | | 315/224 |
| 2017/0222644 A1* | 8/2017 | Kinzer | ............... | H03K 17/6871 |

OTHER PUBLICATIONS

Tack, Marnix, et al.; "Next Generation Smart Power Technologies—Challenges and Innovations Enabling Complex SoC Integration;" Digest of Technical Papers, 2008 IEEE International Solid-State Circuits Conference, ISSCC 2008/Session 15/TD: Trends in Signal and Power Transmission/15.6; copyright 2008 IEEE; pp. 17-19.
"LM74700-Q1 Low IQ Reverse Polarity Protection Ideal Diode Controller;" Texas Instruments LM74700-Q1 SNOSD17A, Oct. 2017-Revised Mar. 2018; Copyright 2017-2018 Texas Instruments incorporated; 18 pages.

* cited by examiner

METHODS AND SYSTEMS OF A RECTIFIER CIRCUIT

CROSS-REFERENCE TO RELATED APPLICATIONS

Not Applicable.

BACKGROUND

Switching power converters use a rectifier circuit in association with inductance (e.g., standalone inductor, or a winding of a transformer) to create a higher voltage (boost converter) or a lower voltage (buck converter) from a direct current (DC) source. In early power converters, and even today in lower efficiency power converters, the rectifier circuit is a diode acting as a rectifier. Voltage drop in the forward conduction mode of a diode can be relatively high (e.g., 0.7 to 1.0 Volts or more), thus making the overall efficiency of the power converter low. Power converter designers may attempt to increase efficiency by using a Schottky diode as the rectifier circuit, but even using Schottky diodes the overall efficiency of the power converter may not reach 90%.

When higher efficiency is desired, power converter designers may replace the diode with a standalone field effect transistor (FET) and a separate driver integrated circuit, thus creating a power converter with synchronous rectification. Use of a standalone FET and separate driver integrated increases the number of components on the bill of material (BOM) as well as the cost, and also increases the complexity of the underlying circuit board onto which the various components are mounted.

BRIEF DESCRIPTION OF THE DRAWINGS

For a detailed description of example embodiments, reference will now be made to the accompanying drawings in which.

DEFINITIONS

Figure 1:
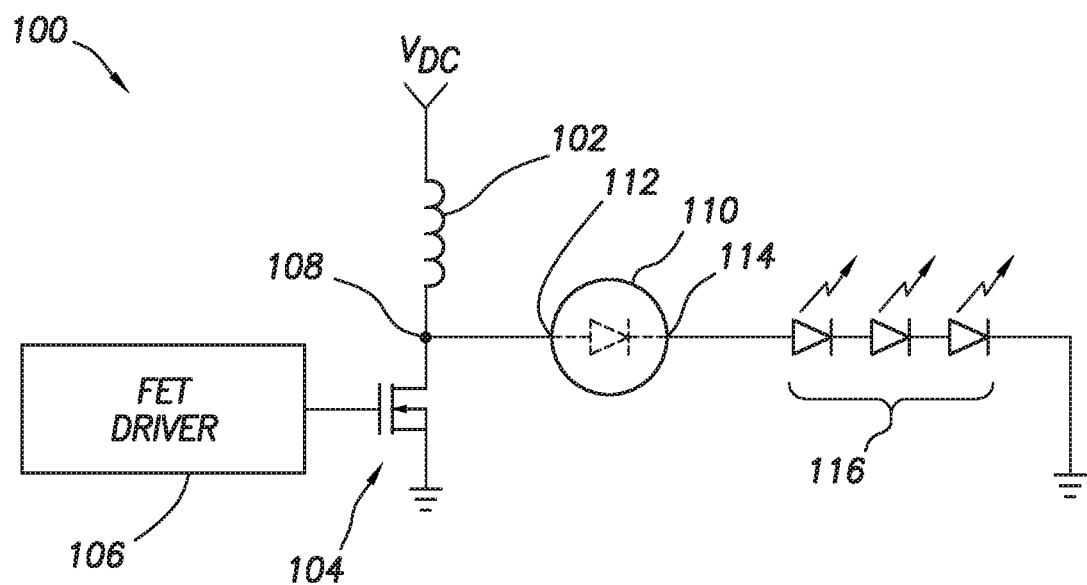
FIG. 1 shows a switching power converter in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Forward bias" and "forward biased" shall mean a positive voltage between an anode terminal and a cathode terminal of a device.

"Reverse bias" and "reverse biased" shall mean a negative voltage between an anode terminal and a cathode terminal of a device.

"Controller" shall mean individual circuit components on a substrate, an application specific integrated circuit (ASIC) constructed on a substrate, a microcontroller constructed on a substrate (with controlling software), or combinations thereof, configured to read signals and take action responsive to such signals.

In relation to electrical devices on a substrate, the terms "input" and "output" refer to electrical connections to the electrical devices, and shall not be read as verbs requiring action. For example, a controller may have a gate output and one or more sense inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various example embodiments are directed to methods and systems of a rectifier circuit which may be used as a diode replacement device. In particular, example embodiments are directed to a two-pin or two-terminal device that may have the same form factor as a diode for placement on circuit boards, but has significantly lower forward voltage drop than any commercially available diode, including Schottky diodes. More particular still, example embodiments are directed to a packaged integrated circuit (IC) device having only two terminals, but internally comprising a FET and a FET controller that makes the FET conductive when the packaged IC device is forward biased, and makes the FET non-conductive during periods when the packaged IC device is reverse biased. The packaged IC is self-powered by charging a bootstrap capacitor during periods of time when the packaged IC is reverse biased. In some example systems, the packaged IC implements a timing circuit that is adjustable and produces a timing signal, and based on the timing circuit the packaged IC predictively makes the FET non-conductive to ensure no reverse current flows through the device. The specification first turns to an example switching power converter circuit to orient the reader.

FIG. 1 shows a switching power converter in accordance with at least some embodiments. In particular, the switching power converter 100 comprises a source of direct current (DC) voltage designated as voltage source $V_{DC}$. The voltage source $V_{DC}$ couples to the first lead of an inductor 102, and the second lead of the inductor couples to the drain of an electrically controlled switch in the example form of a switching FET 104. The source of the switching FET 104 couples to ground. The gate of the switching FET 104 couples to a FET driver 106. The FET driver 106 drives a switching signal to the gate of the switching FET 104, which switching signal may have a frequency of 100 kiloHertz (kHz) or more. Thus, the FET driver 106 and switching FET 104 cyclically couple the switch node 108 to ground to create current flow through the inductor 102.

A rectifier 110 has an anode terminal 112 coupled to the switch node 108, and the rectifier 110 has a cathode terminal 114 coupled to a load 116 illustratively shown as three light emitting diodes (LEDs), with the cathode of the third LED coupled to the ground. When the switching FET 104 is conductive, the rectifier 110 blocks reverse current flow (e.g., from a smoothing capacitor (not specially shown) between the rectifier 110 and the load 116, or from parasitic capacitance of the system). When the switching FET is conductive, current builds in the inductor 102 and so too does the electric and magnetic field around the inductor 102. When the switching FET 104 is then made non-conductive, the collapsing field drives current through the switch node 108 to the rectifier 110, which forward biases the rectifier 110 and thus provides current to the load 116. Once the field around the inductor 102 partially collapses (for continuous current modes) or fully collapses (for discontinuous current modes), the switching FET 104 again becomes conductive and the cycle repeats.

Thus, when the voltage across the rectifier 110 is forward biased (i.e., the voltage at the anode terminal 112 is higher than the voltage at the cathode terminal 114), the rectifier 110 conducts current. Oppositely, when the voltage across the rectifier 110 is reverse biased (i.e., the voltage at the anode terminal 112 is lower than the voltage at the cathode terminal 114), the rectifier 110 blocks current flow from the cathode terminal 114 to the anode terminal 112. As implied by the symbol within the rectifier 110, the rectifier 110 performs a diode function. However, voltage drop in the forward conduction mode of a diode can be relatively high (e.g., 600 to 1000 milliVolts (mV) or more). Schottky diodes are better, having a forward voltage drop 200 to 450 mV, but even when using Schottky diodes, the overall efficiency of the switching power converter 100 may not reach 90%.

Figure 2:
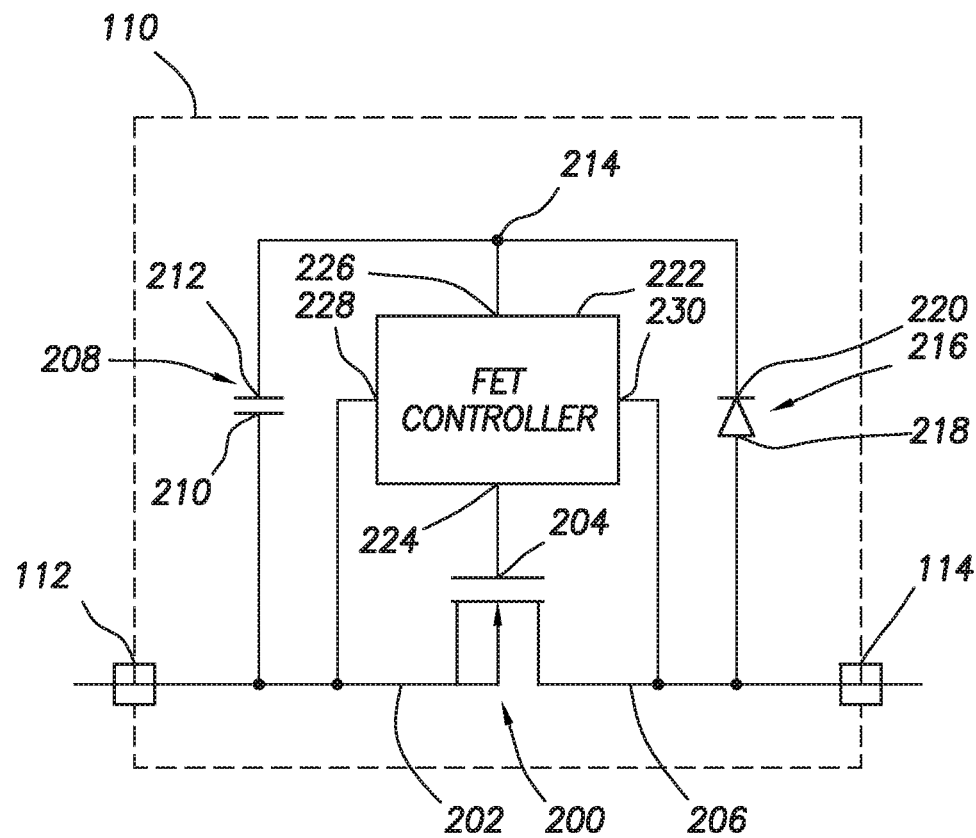
FIG. 2 shows, in a mixed schematic and block diagram form, a rectifier in accordance with at least some embodiments.

FIG. 2 shows, in a mixed schematic and block diagram form, the rectifier 110 in accordance with at least some embodiments. In particular, the rectifier 110 in accordance with example embodiments includes a FET 200. The FET 200 defines a source 202, a gate 204, and a drain 206. The source 202 couples to the anode terminal 112. The drain 206 couples to the cathode terminal 114. The rectifier 110 further comprises a bootstrap capacitor 208 having a first lead 210 coupled to the anode terminal 112, and a second lead 212 coupled to a power node 214. The example rectifier 110 further comprises diode 216 that defines anode lead 218 and a cathode lead 220. The anode lead 218 couples to the cathode terminal 114, and the cathode lead 220 couples to the power node 214. Thus, the bootstrap capacitor 208 is coupled between the cathode lead 220 of the diode 216 and the anode terminal 112.

The example rectifier 110 further comprises a FET controller 222. The FET controller 222 defines gate output 224, a power input 226, an anode sense input 228, and a cathode sense input 230. The power input 226 is coupled to the power node 214. The anode sense input 228 is coupled to the anode terminal 112. The cathode sense input 230 is coupled to the cathode terminal 114. In the example system, the FET controller 222 has a single power input 226 coupled to the power node 214; however, in other embodiments the FET controller 222 has a separate inputs for connecting to the bootstrap capacitor 208 and the cathode lead 220 of the diode 216 (e.g., the power node would reside inside the FET controller 222).

In accordance with example embodiments, the rectifier 110 is a packaged integrated circuit (IC) having package size and dimensions designed and constructed to be a direct replacement component for traditional diodes. More particularly, the dashed line surrounding the various components in FIG. 2 shows that the example rectifier 110 is a packaged IC or packaged semiconductor device (e.g., a semiconductor die encased in an encapsulant), in some cases having only two terminals. The packaging type may take any suitable form, such as any of the "diode outline" (DO) packages having two electrical wires as leads or terminals (e.g., DO-41), any of a variety of "transistor outline" (TO) packages (e.g., TO-220), any of a variety of "small outline" packaging (e.g., SO8), and any suitable through-hole or surface mount packaging system (e.g., "decawatt" packages (DPAK)). The specification now turns to operation of the example rectifier 110, starting with how the device derives operational power.

Still referring to FIG. 2, again the example rectifier 110 includes bootstrap capacitor 208 and diode 216. In the example system shown, the bootstrap capacitor 208 and the diode 216 are distinct components from the FET controller 222; however, in other example systems the diode 216 may be fully or partly integrated on the semiconductor die of the FET controller 222. Thus, the functionality of the diode 216 may be implemented in the form on an onboard regulator, current limiter, or electrically controlled switch that couples the cathode terminal 114 to the positive terminal of the capacitor 208. During periods of time when the rectifier 110 is reverse biased (i.e., the voltage on the cathode terminal 114 is higher than the voltage on the anode terminal 112), electrical current flows through the diode 216 (or any type of conduction device as for instance current source, voltage regulator or switch) and charges the bootstrap capacitor 208. Stated slightly different, the example rectifier 110 stores energy on the bootstrap capacitor 208 when the packaged semiconductor device is reverse biased and the FET 200 is non-conductive. Oppositely, during periods of time when the rectifier 110 is forward biased (i.e., the voltage on the cathode terminal 114 is lower than the voltage on the anode terminal 112), the diode 216 (or any type of more sophisticated switches) blocks current flow out of the bootstrap capacitor 208, and during this period of time the FET controller 222 derives operational power from the bootstrap capacitor 208. Stated slightly different, the example rectifier 110 operates on energy stored on the bootstrap capacitor 208, the energy stored when the packaged semiconductor device is reverse biased and the FET 200 is non-conductive. The amount of time that the FET controller 222 can operate from energy stored on the bootstrap capacitor 208 is dependent on many factors, such as the frequency of the signal applied across the rectifier 110, the capacitance of the bootstrap capacitor 208, the energy usage of the FET controller 222, and the gate 204 leakage current when the FET 200 is conductive, to name a few. In accordance with some embodiments, the rectifier 110 may be a direct replacement for any diode operating at frequencies associated with switching power converters (e.g., 100 kHz or more). The example rectifier 110 is not intended to be a direct replacement for diodes operating at zero frequency (i.e., DC) or low frequency (e.g., 60 Hz and below). The balance of the discussion assumes the frequency of operation of the signal applied across the rectifier 110, as well as the capacitance of the bootstrap capacitor 208 and energy draw of the FET controller 222, are such that the FET controller 222 has sufficient energy to operate the FET controller 222 during the entire period of time the rectifier 110 is forward biased.

The example FET controller 222 is configured to make the FET 200 conductive as the rectifier 110 becomes forward biased, and the FET controller 222 is configured to make the FET 200 non-conductive during periods of time when the rectifier 110 is reverse biased. Making the FET 200 conductive involves coupling energy from the bootstrap capacitor 208 to the gate 204 of the FET 200, and the example FET controller 200 couples the energy to the gate 204 when the packaged semiconductor device becomes forward biased. However, in order to ensure that no reverse current flows through the rectifier 110, the example FET controller 222 makes the FET 200 non-conductive prior to when the rectifier 110 becomes reverse biased. Making the FET 200 non-conductive prior to when the rectifier 110 becomes reverse biased is based on at least two operational considerations. First, making the FET 200 non-conductive takes a finite amount of time (e.g., the amount of time to drain the current from the gate 204 to the source 202). Thus, the process of making the FET 200 non-conductive starts prior to the reverse bias condition to ensure that no reverse current flows from the cathode terminal 114 to the anode terminal 112. Second, one of the advantages of the example rectifier 110 is that the forward voltage drop across the rectifier is significantly lower than a standalone diode (e.g., in some cases the forward voltage drop may be 100 mV or less); however, near the end of a forward bias cycle, the current through the rectifier 110 may be dropping significantly, and thus making the FET 200 non-conductive, and relying on the inherent body diode of the FET 200 to carry the remaining relatively small forward current, does not significantly affect the efficiency of the rectifier 110 because the duration of remaining body diode conduction is short.

In terms of making the FET 200 conductive, in the example embodiments the FET controller 222 monitors voltage drop across the FET 200 by way of anode sense input 228 and cathode sense input 230. As voltage and current ramp up across the rectifier 110 at the beginning of a forward bias cycle, FET controller 222 senses the forward bias condition and then drives the gate 204 of the FET 200 by way of gate output 224. Thus, for a small period of time at the beginning of the forward bias cycle, the current flow through the rectifier 110 is carried by the inherent body diode of the FET 200. Again, however, relying on the inherent body diode of the FET 200 to carry the initial current until the FET controller 222 can make the FET 200 conductive does not significantly affect the efficiency of the rectifier 110 considered across the entire forward bias cycle. During the forward bias cycle, the FET controller 222 continues to monitor the voltage drop across the FET 200 (and as discussed more below controls the voltage drop across the FET 200 to a set point voltage). When the voltage across the FET 200 falls below a predetermined value (e.g., that is non-zero and positive), the FET controller 222 makes the FET 200 non-conductive. Thereafter, the FET controller 222 monitors the voltage drop across the rectifier 110 during the reverse bias cycle, and once the rectifier 110 becomes forward biased again at the beginning of the next forward bias cycle, the process repeats. The specification now turns to a discussion of the FET controller 222 in greater detail, as well as several optional operational features.

Figure 3:
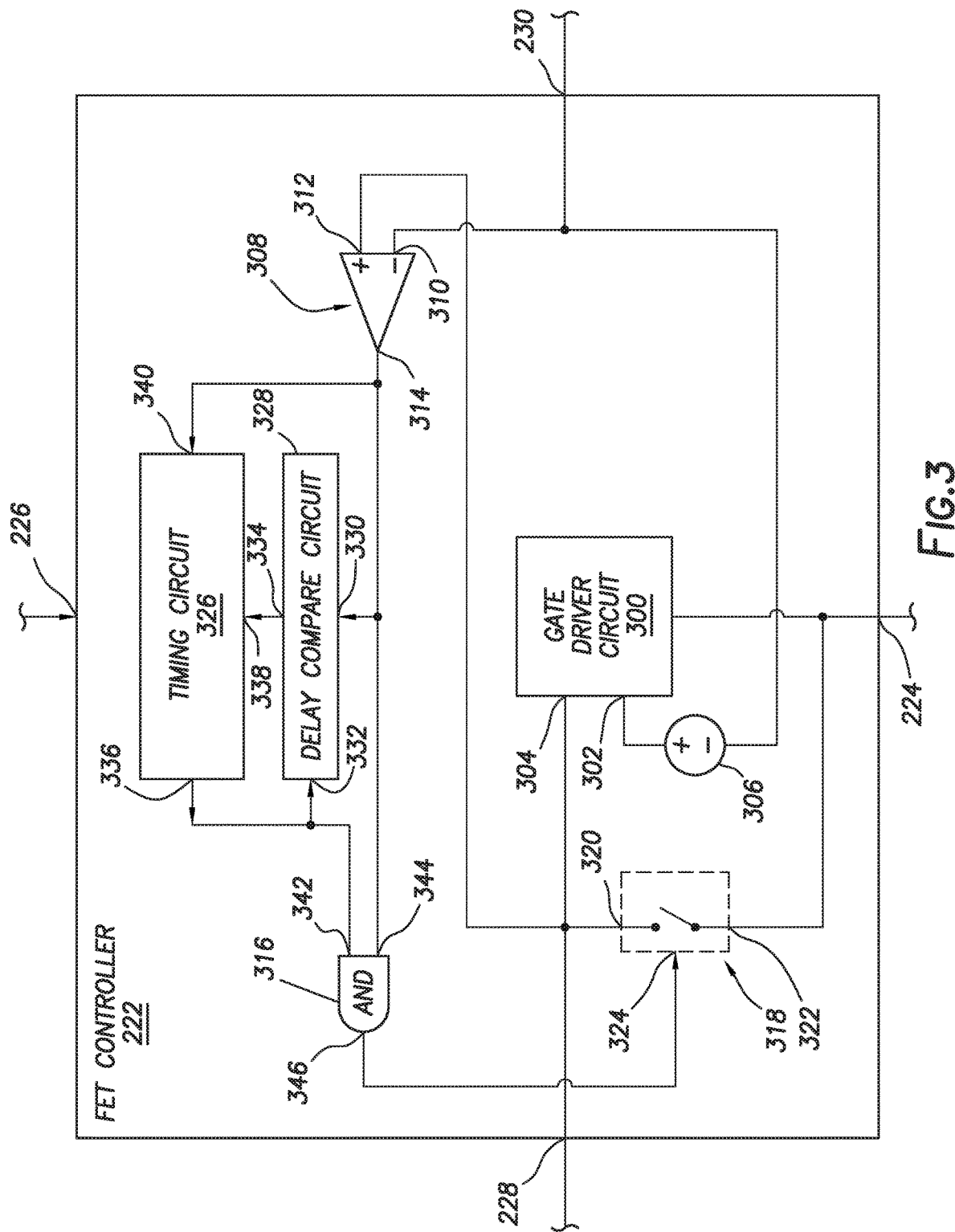
FIG. 3 shows a block diagram of a FET controller in accordance with at least some embodiments.

FIG. 3 shows a block diagram of the FET controller 222 in accordance with at least some embodiments. In particular, FIG. 3 shows the FET controller 222 having gate output 224, power input 226, anode sense input 228, and cathode sense input 230. The various circuits and components of the FET controller 222 are powered by way of the power input 226, but the internal connections for the power are not shown so as not to unduly complicate the figure.

Internally, the example FET controller 222 comprises a gate driver circuit 300. The gate driver circuit 300 defines a set point input 302 and a feedback input 304. The set point input 302 receives a voltage or current that is indicative of a desired or set point voltage drop across the FET 200 (FIG. 2) during the forward bias cycle. In the example system, the set point voltage applied to the set point input 302 is created by an example voltage source 306 (e.g., in some cases 100 mV). That is, the voltage of the voltage source 306 is added to the voltage on the cathode sense input 230. Thus, during at least a portion of the period of time when the rectifier 110 (FIG. 2) is forward biased, the gate driver circuit 300 actively controls the voltage drop across the FET 200 to the set point voltage. Stated otherwise, the gate driver circuit 300 implements a control loop that works to equalize the voltages at the set point input 302 and the feedback input 304. In some cases, the gate driver circuit 300 implements proportional-only control (e.g., an amplifier with a predetermined and fixed gain). In other cases, particularly for frequencies of operation of the rectifier 110 on the lower end of the operational range (e.g., around 100 kHz), the gate driver circuit 300 may also include proportional-integral (PI) or even proportional-integral-differential (PID) control. In example systems, the set point voltage to which the gate driver circuit 300 controls (i.e., the voltage drop across the FET 200) is greater than a voltage drop that could be achieved if the FET 200 was driven at maximum rated gate-to-source voltage. Stated slightly different, the gate driver circuit 300 is configured to drive the gate output 224 (and thus the gate 204 (FIG. 2) of the FET 200) to create a source-to-drain resistance greater than a source-to-drain resistance if the FET 200 was driven at a highest or maximum rated gate-to-source voltage.

The example operational approach of controlling the voltage drop across the FET 200 (FIG. 2) during the forward bias cycle thus enables the gate driver circuit 300 to also, in some embodiments, be solely responsible for making the FET 200 non-conductive as the forward bias cycle nears its end. That is, in the example embodiments the gate driver circuit 300 makes the FET 200 non-conductive at the end of a forward bias cycle when the voltage drop across the FET falls below a predetermined voltage. In the example case of FIG. 3 the predetermined voltage is the set point voltage created by voltage source 306. More specifically still, as the forward bias cycle is waning and the current flow through the rectifier 110 (FIG. 2) is trailing off, the voltage too begins to drop. When the voltage drop across the FET 200 falls below the set point voltage (e.g., that is positive and non-zero), the gate driver circuit 300 shuts off the FET 200 prior to an end of the period of time when the rectifier 110 is forward biased.

In some example systems the gate driver circuit 300 alone may be responsible for making the FET 200 (FIG. 2) non-conductive. However, in other example systems other circuits and devices may participate to ensure the FET 200 is non-conductive during periods of time when the rectifier 110 (FIG. 2) is reverse biased. To that end, the example FET controller 222 further comprises a comparator 308 that defines an inverting input 310, a non-inverting input 312, and a comparator output 314. The inverting input 310 is coupled to the cathode sense input 230. The non-inverting input 312 is coupled to the anode sense input 228. Thus, the comparator 308 is configured to create an asserted signal when the anode sense input 228 has a higher voltage than the cathode sense input 230 (i.e., the rectifier 110 forward biased). The comparator output 314 is coupled (through logic AND gate 316, discussed more below) to a voltage controlled-switch 318. The example voltage-controlled switch 318 defines a first connection 320, a second connection 322, and a control input 324. The first connection 320 is coupled to the anode sense input 228. The second connection 322 is coupled to the gate output 224 (and thus, the gate 204 of the FET 200). The control input 324 is coupled to the comparator output 314 (by way of the logic AND gate 316, though in other example systems the comparator output 314 may couple directly to the control input 324). In accordance with at least some embodiments, the voltage-controlled switch 318 is normally closed switch such that in the event there is insufficient energy stored in the bootstrap capacitor 208 (FIG. 2) to power the FET controller 222, the gate 204 (FIG. 2) of the FET 200 is shorted to the source 202 (FIG. 2) and thus the rectifier 110 operates solely based on the inherent body diode of the FET 200. The voltage-controlled switch may take any suitable form (e.g., a FET) that fulfills the various functions.

During periods of time when the rectifier 110 (FIG. 2) is forward biased, the comparator 308 creates an asserted signal on the comparator output 314 which causes the voltage-controlled switch 318 to open, thus enabling the gate driver circuit 300 to actively control the voltage drop across the FET 200 (FIG. 2) to the set point voltage. However, to the extent that the gate driver circuit 300 has not made the FET 200 fully non-conductive by the end of the forward bias cycle, the comparator 308 de-asserts the signal on the comparator output 314, which closes the voltage-controlled switch 318, shorting the source of the FET 200 to the gate of FET 200 to ensure the FET 200 is non-conductive.

In yet still further embodiments, the FET controller 222 is designed and constructed such that, during a period of forward bias, the FET controller 222 predicts timing of an immediately subsequent reverse bias cycle (e.g., predicts when the reverse bias cycle will begin, and makes the FET 200 (FIG. 2) non-conductive based on the prediction (and prior to the reverse bias condition)). In particular, the example FET controller 222 may further comprise a timing circuit 326 and a delay compare circuit 328. The delay compare circuit 328 defines a first input 330, a second input 332, and a comparison output 334. The first input 330 is coupled to the comparator output 314. The second input 332 is coupled to a timing signal output 336 of the timing circuit 326. The comparison output 334 is coupled to the timing circuit 326. The delay compare circuit 328 analyzes a timing difference between de-assertion of a timing signal on the timing signal output 336 (indicating the prediction of the timing circuit 326) and de-assertion of the signal on the comparator output 314 (indicating reverse bias of the rectifier 110). The delay compare circuit 328 drives an adjustment signal on the comparison output 334. The overall timing and the adjustment signal are discussed more below after further explanation of the timing circuit 326.

Timing circuit 326 defines the timing signal output 336, an adjust input 338, and a timing start input 340. The adjust input 338 is coupled to the comparison output 334, and the timing start input 340 is coupled to the comparator output 314. The example FET controller 222 further comprises the logic AND gate 316 mentioned above. The logic AND gate 316 defines a first gate input 342, a second gate input 344, and a gate output 346. In the example system the gate input 342 couples to the timing signal output 336 (and thus the timing signal). The gate input 344 couples to the comparator output 314. The gate output 346 couples to the control input 324 of the voltage-controlled switch 318.

The timing circuit 326 creates and drives a timing signal on the timing signal output 336. More particularly, during periods of time that the rectifier 110 (FIG. 2) is forward biased, the timing circuit 326 predicts timing of an immediately subsequent reverse bias of the rectifier 110 by changing a feature of the timing signal. In the example system, the timing signal on the timing signal output 336 is asserted just after the rectifier 110 becomes forward biased (e.g., the timing signal output 336 is asserted when the comparator output 314 is asserted). The timing circuit 326 keeps the timing signal on the timing signal output 336 asserted for a period of time being an expected length of time or time duration of a forward bias cycle of the rectifier 110 less a predetermined length of time (e.g. a non-zero guard band).

In operation then, when the rectifier 110 (FIG. 2) becomes forward biased, the comparator output 314 becomes asserted and the timing signal on the timing signal output 336 becomes asserted. With both the gate input 342 and gate input 344 of the logic AND gate 316 asserted, the gate output 346 becomes asserted and the voltage-controlled switch 318 opens. With the voltage-controlled switch 318 open the gate driver circuit 300 actively controls the voltage drop across the FET 200 (FIG. 2) to the set point voltage. Near the end of the forward bias cycle, the timing signal on the timing signal output 336 goes non-asserted, causing the gate output 346 to go non-asserted and thus closing voltage-controlled switch 318. At some point thereafter, the rectifier 110 is reverse biased, and thus the comparator output 314 also becomes non-asserted. The delay compare circuit 328 analyzes the timing between de-assertion of the timing signal output 336 and de-assertion of the comparator output 314. If the length of time between the de-assertions is longer than a predetermined threshold (e.g., longer than a desired guard band), then the delay compare circuit 328 adjusts the timing signal of a subsequent forward bias condition by way of driving a change signal of the comparison output 334. The change signal may take any suitable form, such as an analog signal representing a length of time of when the next timing signal should be asserted, a Boolean signal representing a command to shorten or lengthen the time length of the next timing signal, or the like.

In example embodiments that predict timing of an immediately subsequent or upcoming reverse bias condition, accurate prediction may take several forward and reverse bias cycles from a cold start. Thus, in accordance with at least some embodiments the FET controller 222, (e.g., the timing circuit 326) may be designed and constructed such that the FET controller 222 initially refrains from making the FET conductive and non-conductive for a plurality of initial cycles of forward bias and reverse bias (e.g., 10 forward bias cycles, 100 forward bias cycles). During the refraining, the FET controller 222 (again, e.g., the timing circuit 326) may be adjusting the timing signal to have a feature (e.g., falling edge between an asserted high and non-asserted state) to predict transitions from forward bias to reverse bias as discussed above. In the example case of FIG. 3, the timing circuit 326 would refrain initially from asserting the timing signal and instead monitor the state of the timing start input 340 (particularly the timing between assertion and de-assertion) and set an initial timing based on the monitoring. Thereafter the FET controller 222 would operate normally with the delay compare circuit 328 providing adjustment signals to the timing circuit 326.

It follows from the description regarding predicting timing of an immediately subsequent reverse bias cycle that the example rectifier 110 (FIG. 2) would work well as a diode replacement component in situations where the switching frequency of switching FET 104 (FIG. 1) remains relatively constant, such as LED lighting circuits (e.g., automotive headlamps driving circuits). Nevertheless, the example rectifier 110 would also work in situations where frequency changes infrequently relative to the switching frequency (more precisely, the off time) of the switching FET 104, and in situations where the switching frequency of the switching FET 104 changes regularly (e.g., travel power converters). In cases where the switching frequency of the switching FET 104 changes regularly, the predictive aspects can be omitted or disabled, and making the FET 200 (FIG. 2) non-conductive would be controlled by the combination of the gate driver circuit 300, comparator 308, and voltage controlled switch 318 (omitting the logic AND gate 316).

Figure 4:
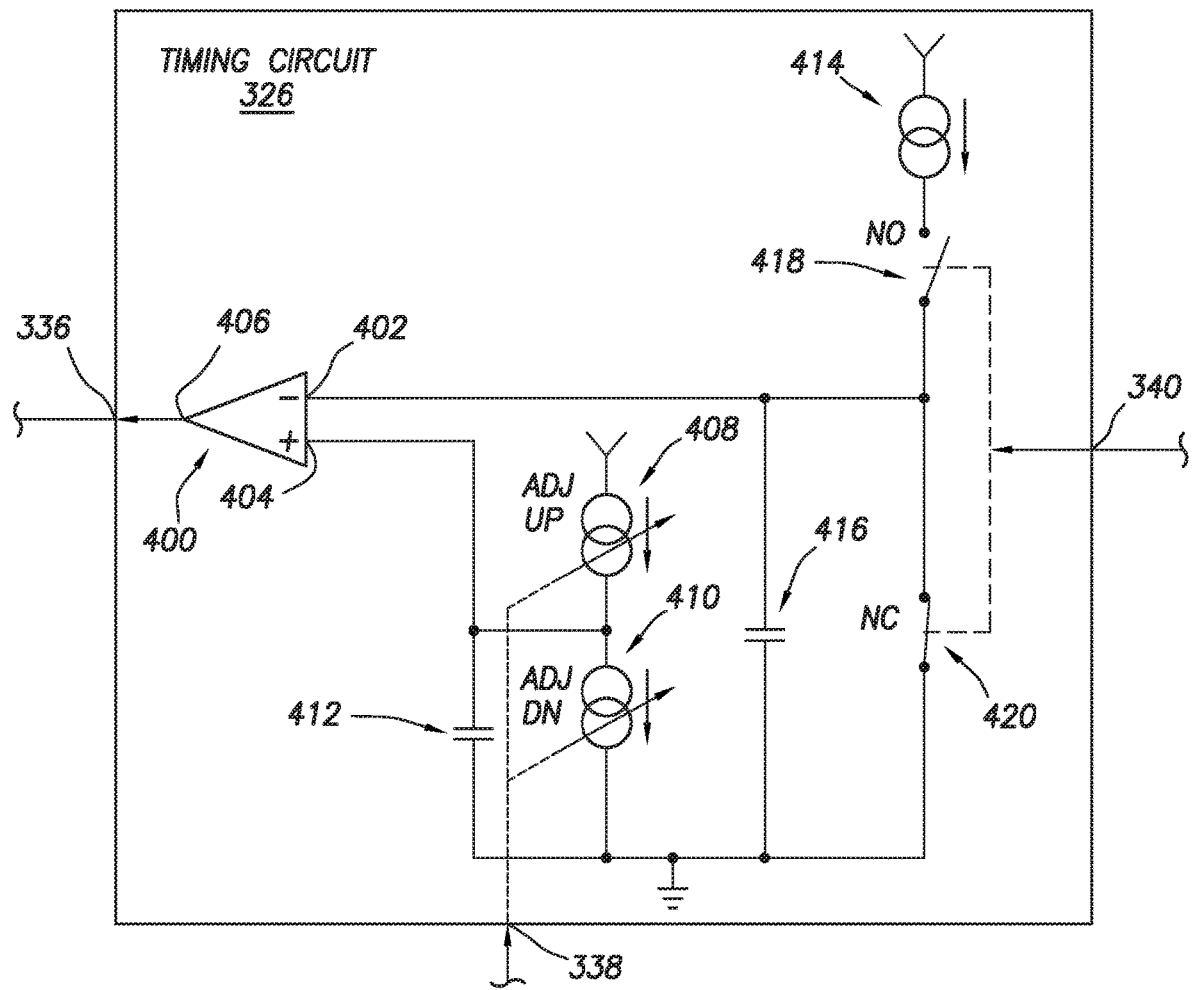
FIG. 4 shows a circuit diagram of a timing circuit in accordance with at least some embodiments.

FIG. 4 shows a circuit diagram of a timing circuit 326 in accordance with at least some embodiments. In particular, the timing circuit 326 of FIG. 4 implements some of the functionality discussed above, but does not implement all the functionality (e.g., refraining from making the FET 200 (FIG. 2) conductive for a plurality of initial cycles). Nevertheless, one of ordinary skill in the art with the benefit of this disclosure could design a FET controller 222 (FIG. 2) with any of the functionality noted. The example timing circuit 326 comprises a comparator 400 that includes an inverting input 402, a non-inverting input 404, and a comparator output 406 upon which the example timing signals are driven to the timing signal output 336. The circuit coupled to the non-inverting input 404 creates an adjustable reference voltage, and the circuit coupled to inverting input 402 is a ramp signal that is reset at the beginning of each forward bias cycle.

The circuit that creates the adjustable reference voltage may take any suitable form, but in the example of FIG. 4 the adjustable reference voltage is created by a first controlled-current source 408, a second controlled-current source 410 and a capacitor 412. In particular, the capacitor 412 has a first lead coupled to the non-inverting input 404, and a second lead coupled to ground. The first controlled-current source 408 couples on one side to a power rail, and couples on the second side to the non-inverting input 404. The second controlled-current source 410 couples on one side of the non-inverting input 404. The current produced by controlled-current sources 408 and 410 is controlled by the adjust input 338. The current produced by the controlled-current sources 408 and 410 may initially be adjusted to create a net current flow into the capacitor 412. When a suitable voltage is created and stored on the capacitor 412 (e.g., a voltage that keeps the timing signal on the timing signal output 336 asserted for a period of time being an expected length of time or time duration of a forward bias cycle of the rectifier 110 less a predetermined length of time), the voltage may be maintained by making the controlled-current sources 408 and 410 produce identical or near-identical currents. For example, the second controlled-current source 410 drives a first current, and the first controlled-current source 408 drives a second current higher by an amount of leakage current from the capacitor 412 such that voltage on the capacitor 412 stays constant. In the example system, when the timing signal needs to be longer the two controlled-current sources 408 and 410 are adjusted to raise the voltage. And when the timing signal needs to be shorter the two controlled-current sources 408 and 410 are adjusted to lower the voltage on the capacitor 412.

Still referring to FIG. 4, the circuit coupled to inverting input 402 is a ramp signal that is reset at the beginning of each forward bias cycle. In particular, the ramp signal is created by a current source 414 which is not depicted to be adjustable, but could be in alternate embodiments. The current source 414 is coupled on one side of the power rail, and is coupled on the second side of the inverting input 402 of the comparator 400 by way of electrically-controlled switch 418. The circuit further comprises capacitor 416 having one lead coupled to ground, and a second lead coupled to the inverting input 402 (and thus the current source 414). Coupled in parallel with the capacitor 416 is electrically-controlled switch 420. The example electrically-controlled switch 418 is a normally open switch, while example electrically-controlled switch 420 is a normally closed switch. The switches 418 and 420 are operated in unison by the signal on the timing start input 340, which signal is asserted by comparator 308 (FIG. 3) at the beginning of each forward bias cycle.

Thus, consider that the example timing circuit 326 has been operating for at least a few cycles such that the reference voltage on the capacitor 412 is non-zero and relatively close to an ultimate voltage (for a fixed frequency of the switching FET 104 (FIG. 1)). During periods of reverse bias on the rectifier 110 (FIG. 2), the timing start input 340 is de-asserted and thus the electrically-controlled switch 420 is closed and conducting. It follows that non-inverting input 404 is at a higher voltage and the timing signal output 336 is asserted (though the FET 200 (FIG. 2) is still non-conductive based on operation of the logic AND gate 316 (FIG. 3)). Once the rectifier 110 becomes forward biased, the timing start input 340 is asserted. The electrically-controlled switch 420 opens, the electrically-controlled switch 418 closes, and voltage begins to build on the capacitor 416. At some point thereafter, the voltage on capacitor 416 exceeds the reference voltage held on capacitor 412, and the comparator 400 changes states, de-asserting the timing signal output 336. Once the timing signal output 336 is de-asserted, the FET 200 is made non-conductive (by operation of logic AND gate 316 and voltage-controlled switch 318). Though voltage continues to build on capacitor 416, no further change of state is possible. At some point thereafter (e.g., a period of time represented by the guard band), the rectifier 110 becomes reverse biased, timing start input 340 is de-asserted, electrically-controlled switch 418 opens, and electrically-controlled switch 420 closes (discharging capacitor 416). The process starts anew at the next forward bias cycle.

If the delay compare circuit 328 detects a timing issue (e.g., timing signal de-asserted too early in relation to the reverse bias condition, or the timing signal de-asserted too late in relation to the reverse bias condition), then the delay compare circuit 328 may adjust the reference voltage held on the capacitor 412 as needed.

Returning briefly to FIG. 2. In some example systems, the FET controller 222 and FET 200 may be constructed and reside on the same semiconductor substrate. Thus, the substrate comprising the combined FET controller 222 and FET 200 is combined with a separate bootstrap capacitor(s) 208 and separate diode 216 into a packaged semiconductor device (approximated by the dashed lines in FIG. 2). In other cases (e.g., higher current ratings for the FET 200), the FET controller 222 and the FET 200 may be individual components combined into a multi-chip module (along with the bootstrap capacitor 208 and diode 216) to form a packaged semiconductor device. In yet still other cases, either the bootstrap capacitor 208, the diode 216, or both could be constructed on the substrate with the FET controller 222. While in some cases the packaging for the rectifier 110 is meant to be a direct replacement part for a diode, in other cases the packaging may take any suitable form (e.g., SO8).

The FET 200 may also be made non-conductive based on the gate-to-source voltage. The intent of this feature is to detect a zero crossing current flowing through the FET 200. During the rectification phase of the switching power converter 100 of FIG. 1, the current is dropping. Therefore there is a risk of reaching zero current during the predefined FET conduction time, a situation that is asynchronous and random for the conduction time of the controller. One possible implementation to detect that current zero crossing is to monitor the gate-to-source voltage (regulated by gate driver circuit 300). When Vgs is falling below a predetermined threshold, it means that the current is too low and the gate can be switched off. It worth noting that when the current is low, the efficiency is not impacted by the conduction though the inherent FET body diode. Furthermore, the $V_{GS}$ detection is optional because when the current will flow negatively or disappears $V_{DS}$ will naturally drop causing a $V_{DS}$ detection.

Figure 5:
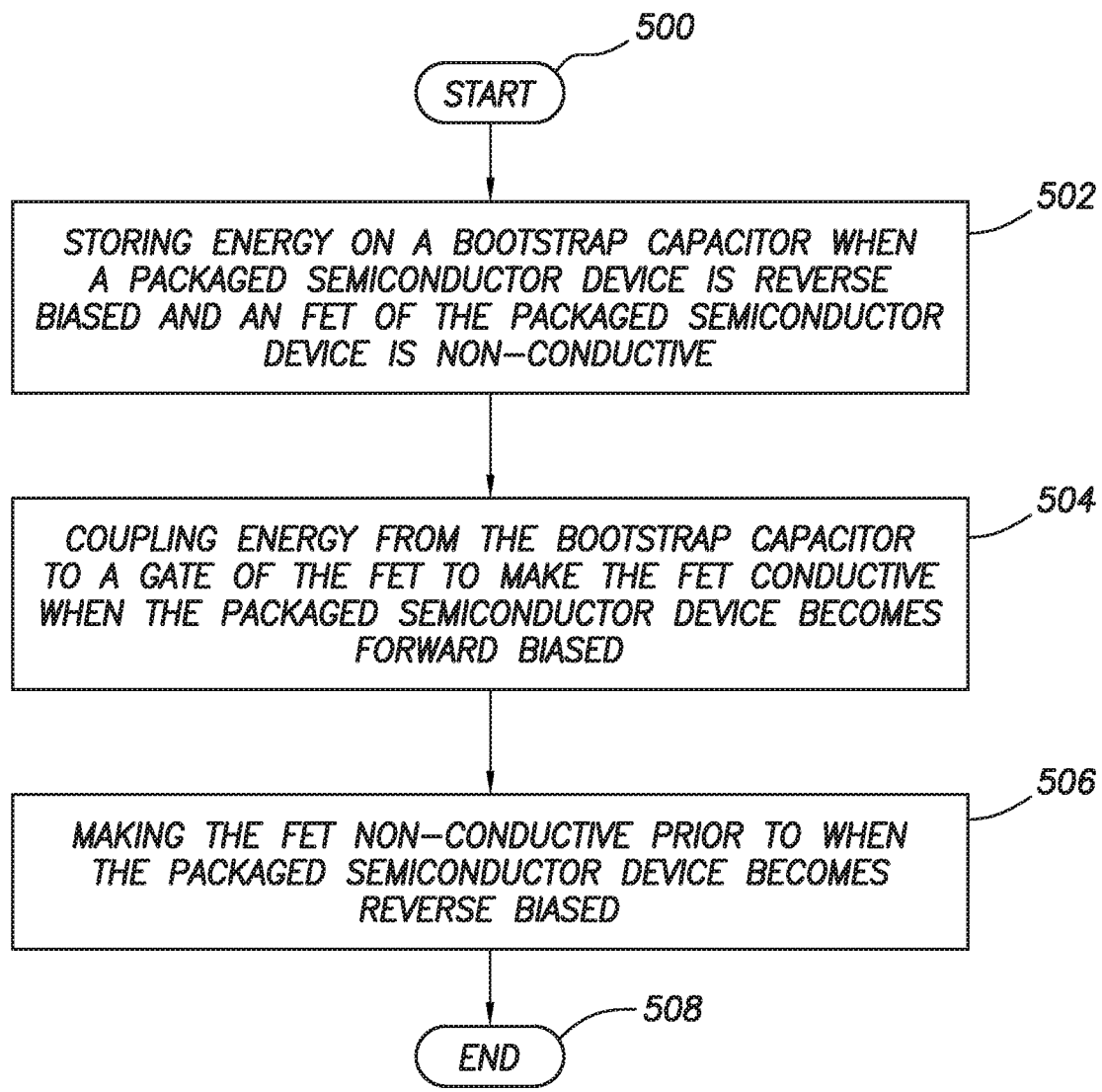
FIG. 5 shows a flow diagram of a method in accordance with at least some embodiments.

FIG. 5 shows a flow diagram of a method in accordance with at least some embodiments. In particular, the method starts (block 500) and comprises: storing energy on a bootstrap capacitor when a packaged semiconductor device is reverse biased and a FET of the packaged semiconductor device is non-conductive (block 502); coupling energy from the bootstrap capacitor to a gate of the FET to make the FET conductive when the packaged semiconductor device becomes forward biased (block 504); and then making the FET non-conductive prior to when the packaged semiconductor device becomes reverse biased (block 506). Thereafter, the method ends (block 508), likely to be restarted on the next switching cycle of the switching FET 104 (FIG. 1).

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s) (e.g., the upper lead of capacitor 416 and inverting input 402).

The above discussion is meant to be illustrative of the principles and various embodiments of the present invention. Numerous variations and modifications will become apparent to those skilled in the art once the above disclosure is fully appreciated. The bootstrap capacitor 208 may be implemented either as a simple capacitor, a set of series capacitors (for safety reasons) or as any predominantly capacitive energy reservoir, including switched capacitor techniques that optimize the overall energy flow in the system or regulate the actual voltage provided to the controller. It is intended that the following claims be interpreted to embrace all such variations and modifications.

What is claimed is:

1. A packaged integrated circuit (IC) comprising:
   a first terminal electrically exposed on an outer surface of the packaged IC;
   a second terminal electrically exposed on the outer surface of the packaged IC, the second terminal distinct from the first terminal;
   a field effect transistor (FET) defining a drain, a source, and a gate, the source coupled directly to the first terminal, and the drain coupled directly to the second terminal;
   a diode having an anode and a cathode, the anode coupled to the second terminal;
   a bootstrap capacitor coupled between the cathode of the diode and the first terminal; and
   a FET controller coupled to the gate of the FET, the bootstrap capacitor, and the cathode of the diode;
   the FET controller configured to make the FET conductive as the packaged IC becomes forward biased by a voltage on the first terminal being greater than a voltage on the second terminal, and the FET controller configured to make the FET non-conductive during periods of time when the packaged IC is reverse biased by the voltage on the second terminal being greater than the voltage on the first terminal.

2. The packaged IC of claim 1 wherein the FET controller is further configured to drive current from the bootstrap capacitor to the gate to make the FET conductive, and to directly couple the gate to the source prior to the packaged IC becoming reverse biased.

3. The packaged IC of claim 1 wherein the FET controller further configured to, during periods of forward bias, predict timing of an immediately subsequent reverse bias, and configured to turn off the FET based on the predicted timing.

4. The packaged IC of claim 1 wherein the FET controller further comprises a gate driver circuit, the gate driver circuit configured to control a voltage drop across the FET to a set point voltage greater than a voltage drop achieved if the gate of the FET is driven at a highest rated gate-to-source voltage.

5. The packaged IC of claim 4 wherein the FET controller is further configured to make the FET non-conductive at an end of a forward bias cycle when the voltage drop across the FET falls below a predetermined voltage.

6. The packaged IC of claim 5 wherein the set point voltage and the predetermined voltage are equal.

7. The packaged IC of claim 1 wherein the FET controller is further configured to monitor a voltage across the gate and the source of the FET, and further configured to make the FET non-conductive when the voltage across the gate and the source fall below a predetermined threshold.

8. The packaged IC of claim 1 further comprising the first terminal and the second terminal are the only two terminals of the packaged IC.

9. A packaged integrated circuit (IC) comprising:
   a first terminal electrically exposed on an outer surface of the packaged IC;
   a second terminal electrically exposed on the outer surface of the packaged IC, the second terminal distinct from the first terminal;
   a field effect transistor (FET) defining a drain, a source, and a gate, the source coupled to the first terminal, and the drain coupled to the second terminal;
   a diode having an anode and a cathode, the anode coupled to the second terminal;
   a bootstrap capacitor coupled between the cathode of the diode and the first terminal; and
   a FET controller coupled to the gate of the FET, the bootstrap capacitor, and the cathode of the diode wherein the FET controller further comprises a timing circuit that is adjustable and produces a timing signal;
   the FET controller configured to make the FET conductive as the packaged IC becomes forward biased by a voltage on the first terminal being greater than a voltage on the second terminal, and the FET controller configured to make the FET non-conductive during periods of time when the packaged IC is reverse biased by the voltage on the second terminal being greater than the voltage on the first terminal;
   the FET controller further configured to, during periods of forward bias, predict timing of an immediately subsequent reverse bias, and configured to turn off the FET based on the predicted timing;

the FET controller is configured to adjust the timing circuit to a frequency of a signal applied across the first terminal and the second terminal; and the FET controller is configured to predict timing based on assertion of the timing signal.

10. A method comprising:

reverse biasing a packaged semiconductor device by applying a voltage on a cathode terminal of the packaged semiconductor device greater than a voltage applied on an anode terminal of the packaged semiconductor device, the anode and cathode terminals electrically accessible on an exterior surface of the packaged semiconductor device, and the anode and cathode terminals are the only terminals electrically accessible on the exterior surface of the packaged semiconductor device;

storing energy on a bootstrap capacitor within the packaged semiconductor device when the packaged semiconductor device is reverse biased and a field effect transistor (FET) of the packaged semiconductor device is non-conductive; and then forward biasing the packaged semiconductor device by applying a voltage on the anode terminal greater than a voltage applied on the cathode terminal;

coupling energy from the bootstrap capacitor to a gate of the FET to make the FET conductive when the packaged semiconductor device is forward biased; and then making the FET non-conductive prior to when the packaged semiconductor device becomes reverse biased.

11. The method of claim 10 wherein coupling energy from the bootstrap capacitor further comprises controlling voltage drop across the FET to a set point voltage.

12. The method of claim 11 wherein controlling voltage drop across the FET further comprises driving the gate to create a source-to-drain resistance of the FET greater than a source-to-drain resistance if the FET was driven at its highest rated gate-to-source voltage.

13. The method of claim 12 wherein making the FET non-conductive further comprises making the FET non-conductive at an end of a forward bias cycle when the voltage drop across the FET falls below a predetermined voltage.

14. The method of claim 13 wherein the set point voltage and the predetermined voltage are equal.

15. The method of claim 10 wherein making the FET non-conductive further comprises, during a period of time when the packaged semiconductor device is forward biased:
sensing that the forward bias is waning; and
shorting the gate of the FET to a source of the FET to make the FET non-conductive prior to an end of the period of time when the packaged semiconductor device is forward biased.

16. The method of claim 10 wherein making the FET non-conductive further comprises:

monitoring a voltage across the gate and a source of the FET; and making the FET non-conductive when the voltage across the gate and the source of the FET falls below a predetermined threshold.

17. The method of claim 10 further comprising, during a period of forward bias, predicting timing of an immediately subsequent reverse bias, and making the FET non-conductive based on the predicted timing.

18. A method comprising:

reverse biasing a packaged semiconductor device by applying a voltage on a cathode terminal of the packaged semiconductor device greater than a voltage applied on an anode terminal of the packaged semiconductor device, the anode and cathode terminals electrically accessible on an exterior surface of the packaged semiconductor device;

storing energy on a bootstrap capacitor within the packaged semiconductor device when the packaged semiconductor device is reverse biased and a field effect transistor (FET) of the packaged semiconductor device is non-conductive;

forward biasing the packaged semiconductor device by applying a voltage on the anode terminal greater than a voltage applied on the cathode terminal;

coupling energy from the bootstrap capacitor to a gate of the FET to make the FET conductive when the packaged semiconductor device is forward biased;

predicting, during a period of forward bias, timing of an immediately subsequent reverse bias, and making the FET non-conductive based on the predicted timing;

wherein predicting timing further comprises creating a timing signal, the timing signal having a feature predictive of an end of a forward bias period;

wherein making the FET non-conductive further comprises making the FET non-conductive responsive to a feature of the timing signal.

19. The method of claim 18 further comprising adjusting the timing signal.

20. A method comprising:

reverse biasing a packaged semiconductor device by applying a voltage on a cathode terminal of the packaged semiconductor device greater than a voltage applied on an anode terminal of the packaged semiconductor device, the anode and cathode terminals electrically accessible on an exterior surface of the packaged semiconductor device;

storing energy on a bootstrap capacitor within the packaged semiconductor device when the packaged semiconductor device is reverse biased and a field effect transistor (FET) of the packaged semiconductor device is non-conductive;

forward biasing the packaged semiconductor device by applying a voltage on the anode terminal greater than a voltage applied on the cathode terminal;

coupling energy from the bootstrap capacitor to a gate of the FET to make the FET conductive when the packaged semiconductor device is forward biased;

predicting, during a period of forward bias, timing of an immediately subsequent reverse bias, and making the FET non-conductive based on the predicted timing;

refraining from making the FET conductive and non-conductive for a plurality of initial cycles of forward bias and reverse bias; and during the refraining adjusting a timing signal to have a feature to predict a transition from forward bias to reverse bias in the plurality of initial cycles of forward bias and reverse bias.

21. A switching power converter comprising:

an inductor defining a first lead and a second lead, the first lead configured to be coupled to a voltage source;

an electrically controlled switch coupled on a first side to the second lead of the inductor, and configured to be coupled on a second side to a return or common of the voltage source;

a driver controller coupled to the electrically controlled switch, and configured to periodically make the electrically controlled switch conductive; and a packaged integrated circuit (IC) having only two terminals, the packaged IC comprising:
- a first terminal coupled to the inductor;
- a second terminal configured to be coupled to a load;
- a field effect transistor (FET) defining a drain, a source, and a gate, the source coupled to the first terminal, and the drain coupled to the second terminal;
- a diode having an anode and a cathode, the anode coupled to the second terminal;
- a bootstrap capacitor coupled between the cathode of the diode and the first terminal;
- a FET controller coupled to the gate of the FET, the bootstrap capacitor, and the cathode of the diode;
- the FET controller configured to make the FET conductive as the packaged IC becomes forward biased, and the FET controller configured to make the FET non-conductive during periods of time when the packaged IC is reverse biased.

* * * * *